Jan. 29, 1929.

W. B. WEAVER 1,700,576

ADAPTER AND HEATING APPARATUS

Filed March 4, 1924   2 Sheets-Sheet 1

Inventor
William B. Weaver.

Inventor
William B. Weaver.

Patented Jan. 29, 1929.

1,700,576

UNITED STATES PATENT OFFICE.

WILLIAM B. WEAVER, OF NEW YORK, N. Y.

ADAPTER AND HEATING APPARATUS.

Application filed March 4, 1924. Serial No. 696,820.

My invention relates to means for the adaptation of devices normally intended for certain uses to new and other uses. More specifically my invention relates to devices for use in conjunction with electric irons whereby said irons may be employed for the purposes such as heating and cooking.

One of the principal objects of my invention is the provision of a unitary device embodying a combined stand, supporting bracket and heating and protecting plate of larger area than the pressing surface of an electric iron for said electric iron. Another object of my invention is the provision of an electric iron having several degrees of heat, some of which are adapted for the usual and ordinary uses of the iron, such as ironing and pressing, and others which are adapted for heating and cooking purposes in conjunction with my various devices.

Other objects and advantages of my invention will appear from the following description taken in connection with the accompanying drawings in which, Figure 1 is a perspective view of a preferred embodiment of my invention with an electric iron mounted therein.

Figure 1:
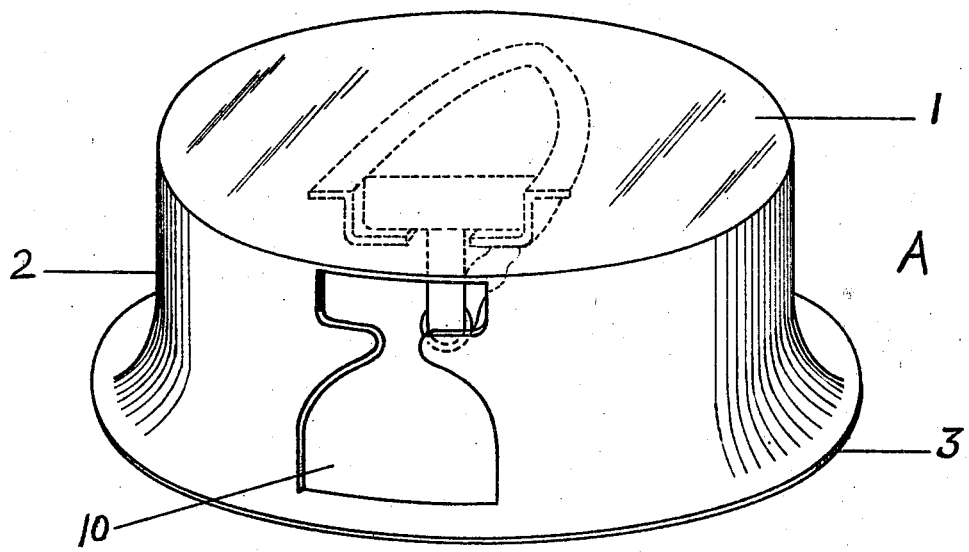
Figure 2:
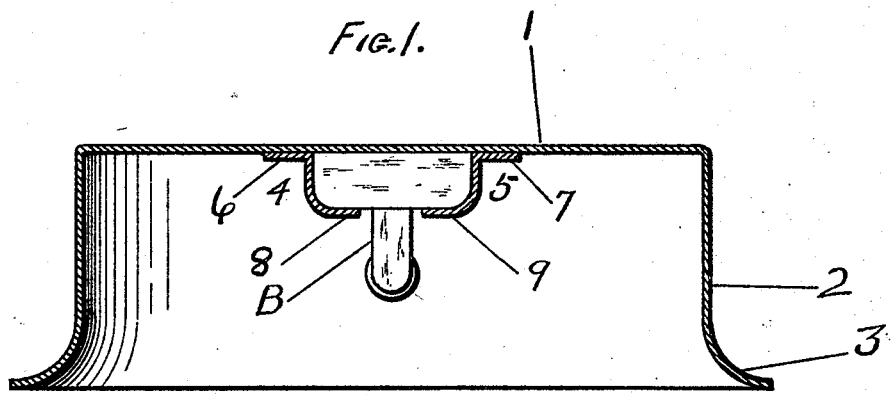
Figure 2 is a cross section view of Figure 1.

Referring to Figures 1 and 2, my unitary device A comprises a circular heating and protecting plate 1 and a downwardly extending cylindrical portion 2 terminating in an outwardly extending flaring part 3 for imparting stability to the device.

My device A is preferably made by die pressing, stamping or spinning or any combination of these various methods out of a suitable aluminum plate of proper configuration, and then preferably polished. However, I do not limit myself to the above methods of construction and manufacture but may employ other suitable methods such as moulding and other materials than aluminum.

The retaining members 4 and 5, having flanges 6 and 7 respectively, and downwardly extending integral curve portions 8 and 9 respectively, may be secured to the inner surface of the heating and protecting plate 1 by welding the flanges 6 and 7 thereto, or by other suitable methods. The retaining members are properly shaped and spaced from each other to receive and retain the electric iron B, or other suitable device in its inverted position with its inverted pressing face in contact with the inner surface of the heating plate 1. The curved portions 8 and 9 may be arranged with an appropriate amount of springiness in order that the inverted surface of the iron may be urged into intimate contact with the inner surface of the heating plate to thereby increase the heat conductivity between the two surfaces.

The portion 2 is of sufficient height to enable the handle of the iron to clear the object on which the device is mounted.

The portion 2 may be cut away as indicated at 10 to permit the iron to be readily inserted between the members 4 and 5.

Figure 3:
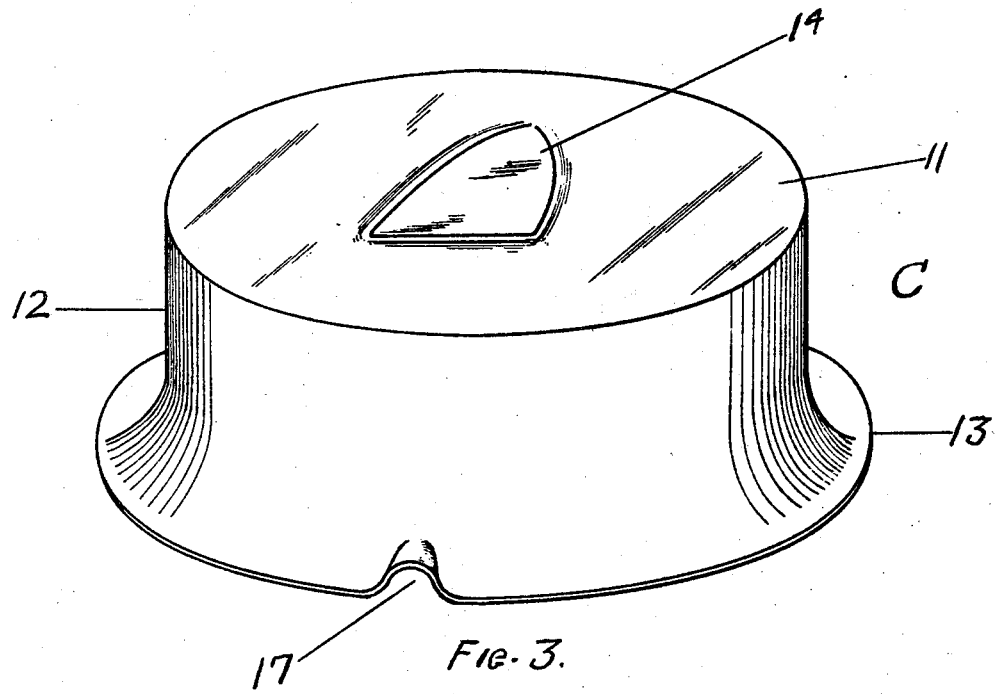
Figure 3 is a perspective view of a second embodiment of my invention.
Figure 4:
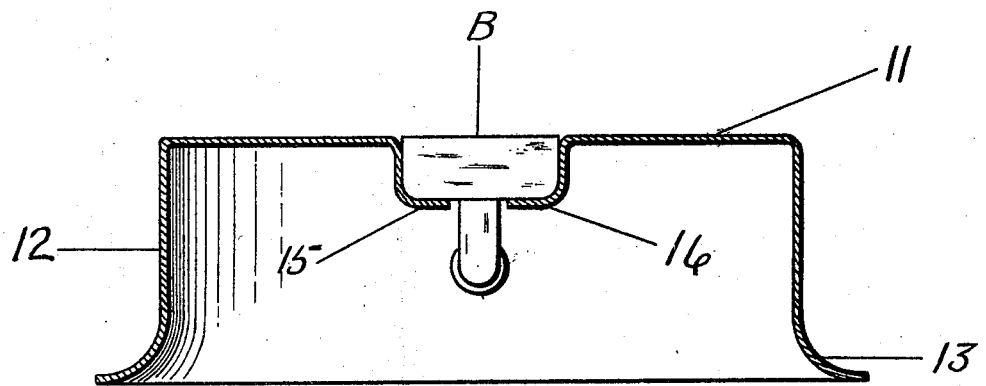
Figure 4 is a cross section view of Figure 3.

Referring to Figures 3 and 4, showing another modification of my invention, the device C comprises a combined heating plate and stand. The heating plate 11 has an integral downwardly extending cylindrical portion 12 terminating in an outwardly extending flange 13.

A central part of the heating plate 11 is cut away at 14 and the edges of the opening bent downward to form curved portions 15 and 16 configured so as to receive and support an electric iron B in its inverted position with its inverted pressing face substantially flush with the outer surface of the heating plate 11. An opening 17 is provided for accommodating the leads connected to the iron B.

The device C is preferably manufactured by die stamping or spinning, or a combination of these two methods out of a single piece of aluminum suitably configured. However, I may employ other methods of manufacture such as moulding and other materials than aluminum.

The iron B may be designed to give different degrees of heat by various series parallel arrangements of its heating elements or by any of the other suitable and well known arrangements in the art. As my invention does not reside in the specific manner of connecting the heating elements; but rather in the combination of an iron capable of giving suitable ironing temperatures and suitable heating temperatures also when used in connection with my adapters; I do not deem it necessary to show specific circuit connections which are thought to be well known in the art.

It is thus seen that I have embodied in simple unitary structures, a combined stand and heating and protecting plate for an electric iron. My adapters possess the further advantages of being easily and cheaply manufactured and ease of handling owing to their unitary nature.

While I have shown and described several preferred modifications of my invention, I do not limit myself to said modification; but may employ such other embodiments as come within the spirit and scope of my invention.

Having described my invention I claim:

1. In combination with a laundry iron having a heat source, a stand including a top plate, holding means depending from said top plate to engage under the body of said iron to hold said iron in inverted position with its heating surface adjacent said plate, upright supporting means depending from said plate near the outer edge thereof and spaced from said holding means and disposed around said iron, said plate extending a substantial distance out from said heating surface so that any one or more of a large number of different size utensils may be supported thereby, said supporting means being adapted to rest upon a supporting surface and to support said plate and iron.

2. In combination with a laundry iron having a source of heat, a stand made from a single sheet of material comprising a top plate, integral supporting means depending from said plate to support said iron with its bottom adjacent said plate, and integral supporting means depending from said plate at the outer edge thereof and disposed outside and spaced from said first-mentioned means, said second-mentioned means being adapted to rest upon a supporting surface and to support said top plate and iron.

WILLIAM B. WEAVER.